(12) United States Patent
Miller

(10) Patent No.: US 11,166,445 B1
(45) Date of Patent: Nov. 9, 2021

(54) TENSION-ADJUSTING FISHING POLE

(71) Applicant: Benny H. Miller, Taylors, SC (US)

(72) Inventor: Benny H. Miller, Taylors, SC (US)

( * ) Notice: Subject to any disclaimer, the term of this patent is extended or adjusted under 35 U.S.C. 154(b) by 205 days.

(21) Appl. No.: 16/674,171

(22) Filed: Nov. 5, 2019

(51) Int. Cl.
*A01K 87/00* (2006.01)

(52) U.S. Cl.
CPC ................................. *A01K 87/00* (2013.01)

(58) Field of Classification Search
CPC ........................................................ A01K 87/00
See application file for complete search history.

(56) References Cited

U.S. PATENT DOCUMENTS

| | | | |
|---|---|---|---|
| 4,800,668 A | 1/1989 | Burrough | |
| 5,195,267 A * | 3/1993 | Daniels | A01K 87/00 43/18.1 |
| 5,316,300 A | 5/1994 | Simmons | |
| 5,632,693 A | 5/1997 | Painter | |
| 6,361,451 B1 | 3/2002 | Masters | |
| 7,226,365 B2 | 6/2007 | Qualizza | |
| 10,343,183 B2 * | 7/2019 | Baylis | B05C 17/005 |
| 2009/0163288 A1 * | 6/2009 | Qualizza | A63B 53/12 473/318 |

FOREIGN PATENT DOCUMENTS

WO    2000016857    3/2000

* cited by examiner

*Primary Examiner* — Joshua J Michener
*Assistant Examiner* — Henry Hooper Mudd
(74) *Attorney, Agent, or Firm* — Kyle A. Fletcher, Esq.

(57) ABSTRACT

The tension-adjusting fishing pole comprises a rod blank, a stiffener, a rod handle, and a reel. The rod handle, the stiffener, and the rod blank may be coupled together to form a fishing pole. The reel may be coupled to a reel seat on the rod handle such that the fishing pole and the reel may be operable as the fishing pole. The rod blank may comprise a hollow interior. A fluid may be forced into the hollow interior of the rod blank by the stiffener and may increase pressure within the rod blank to stiffen the rod blank. The pressure on the fluid may be reduced by the stiffener to allow the rod blank to flex.

15 Claims, 3 Drawing Sheets

TENSION-ADJUSTING FISHING POLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing equipment, more specifically, a tension-adjusting fishing pole.

SUMMARY OF INVENTION

The tension-adjusting fishing pole comprises a rod blank, a stiffener, a rod handle, and a reel. The rod handle, the stiffener, and the rod blank may be coupled together to form a fishing pole. The reel may be coupled to a reel seat on the rod handle such that the fishing pole and the reel may be operable as the fishing pole. The rod blank may comprise a hollow interior. A fluid may be forced into the hollow interior of the rod blank by the stiffener and may increase pressure within the rod blank to stiffen the rod blank. The pressure on the fluid may be reduced by the stiffener to allow the rod blank to flex.

An object of the invention is to deploy a fishing line from a reel of a fishing pole during a casting operation and retrieve the fishing line by turning a crank on the reel.

Another object of the invention is to vary the stiffness of a rod blank on the fishing pole such that the rod blank is less stiff during casting.

A further object of the invention is to increase the stiffness of the rod blank by moving a piston into a hollow interior the rod blank such that a fluid within the hollow interior is pressurized.

Yet another object of the invention is to decrease the stiffness of the rod blank by moving the piston out of the hollow interior the rod blank such that a fluid within the hollow interior is de-pressurized.

These together with additional objects, features and advantages of the tension-adjusting fishing pole will be readily apparent to those of ordinary skill in the art upon reading the following detailed description of the presently preferred, but nonetheless illustrative, embodiments when taken in conjunction with the accompanying drawings.

In this respect, before explaining the current embodiments of the tension-adjusting fishing pole in detail, it is to be understood that the tension-adjusting fishing pole is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tension-adjusting fishing pole.

It is therefore important that the claims be regarded as including such equivalent construction insofar as they do not depart from the spirit and scope of the tension-adjusting fishing pole. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
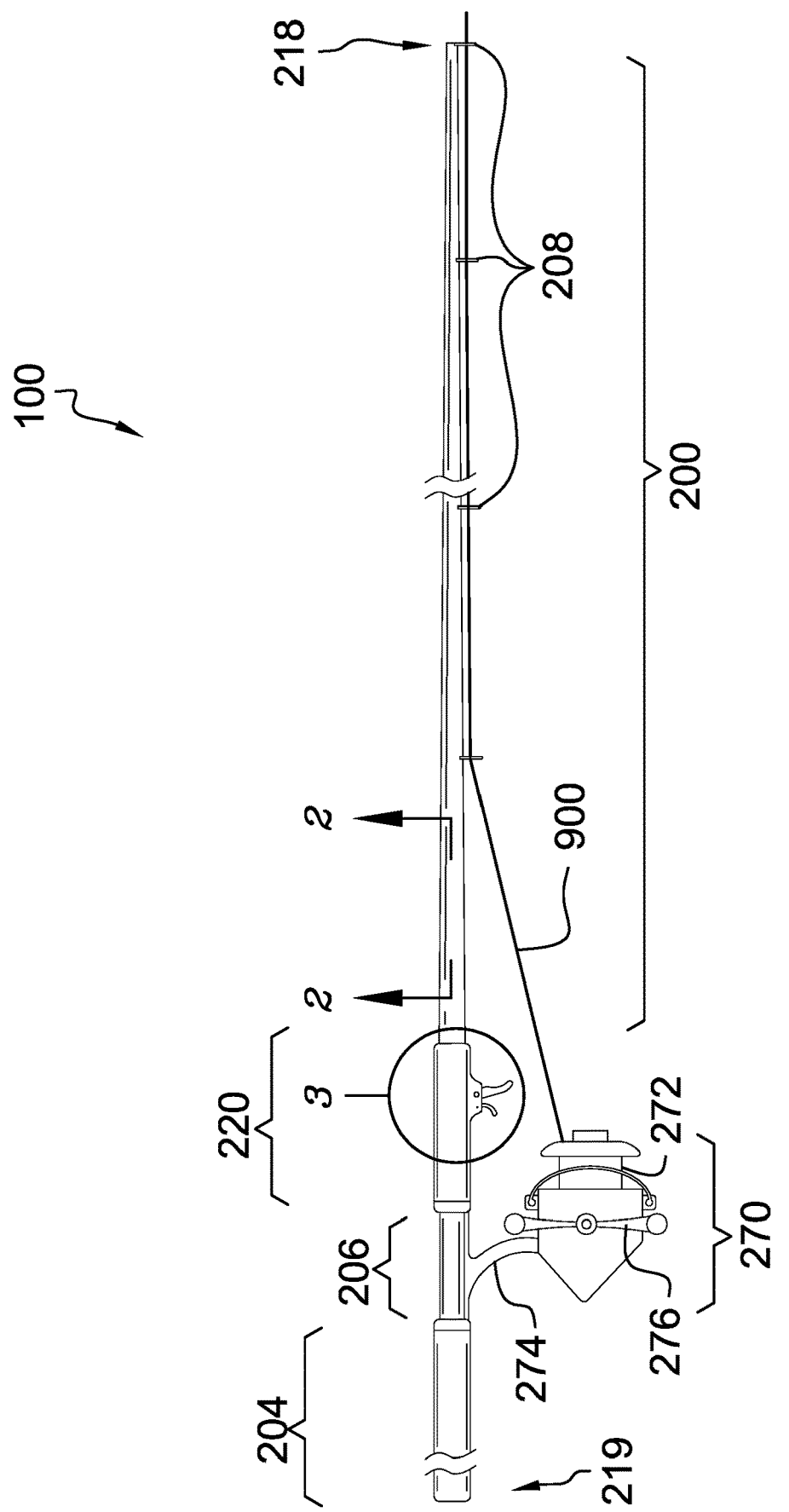
FIG. 1 is a side view of an embodiment of the disclosure.
Figure 2:
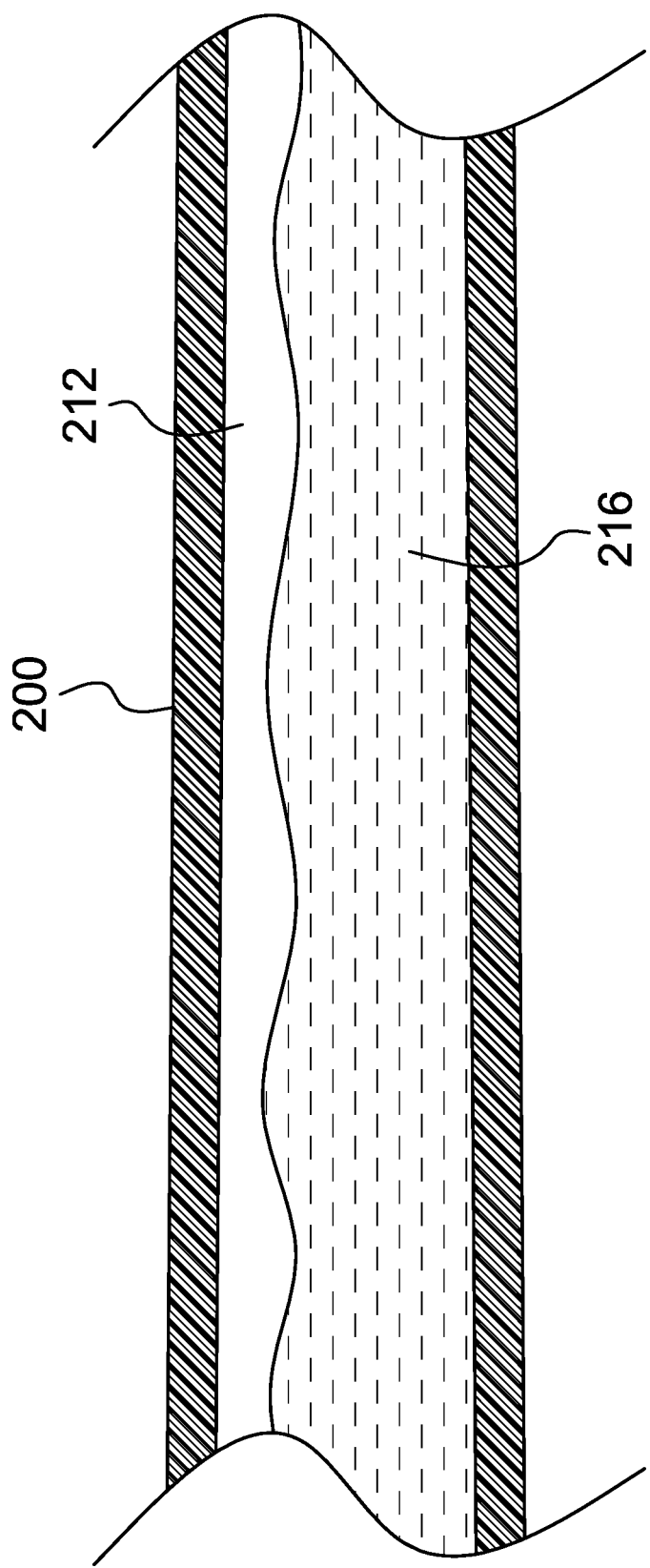
FIG. 2 is a cross-sectional view of an embodiment of the disclosure across 2-2 as shown in FIG. 1.
Figure 3:
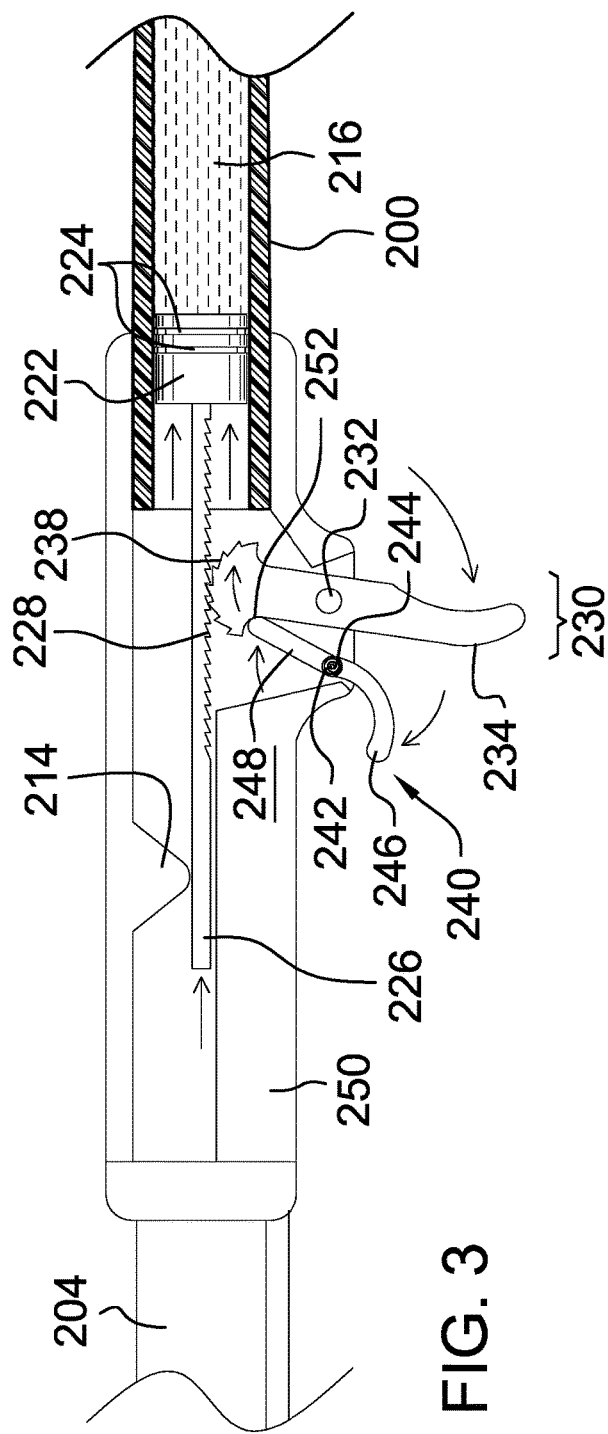
FIG. 3 is a detail view of an embodiment of the disclosure in the area designated 3 on FIG. 1 and illustrating the piston in a forward position such that the fluid is pressurized.
Figure 4:
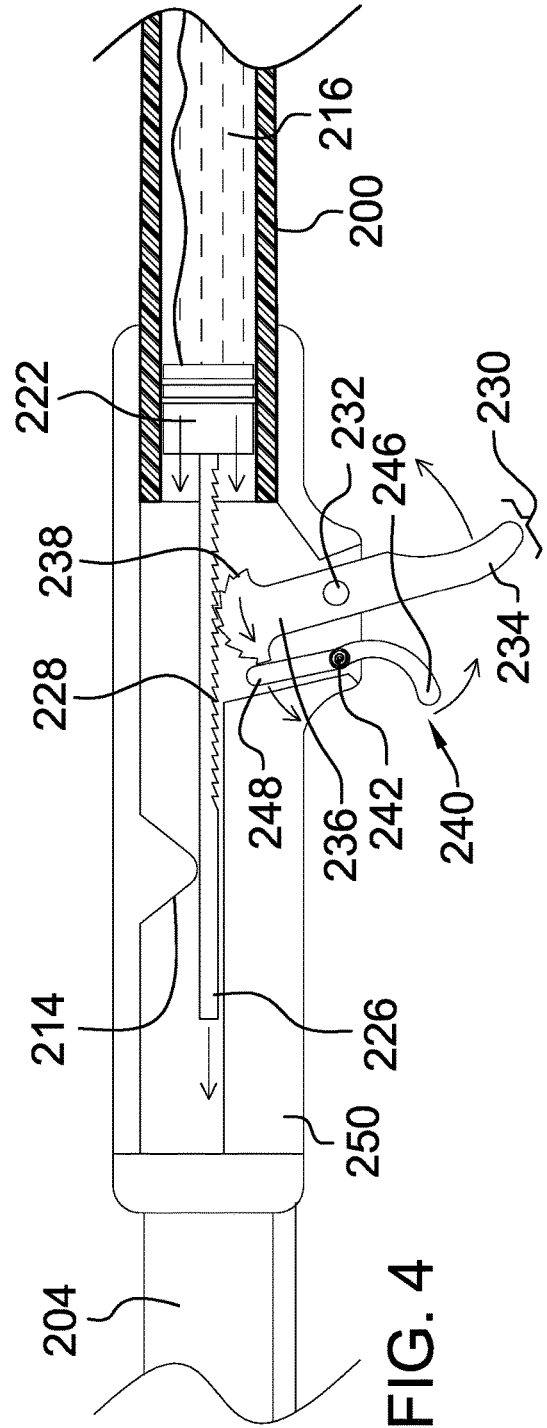
FIG. 4 is a detail view of an embodiment of the disclosure showing the same area as FIG. 3 and illustrating the piston in a rearward position such that the fluid is de-pressurized.

Detailed reference will now be made to a first potential embodiment of the disclosure, which is illustrated in FIGS. 1 through 4.

The tension-adjusting fishing pole 100 (hereinafter invention) comprises a rod blank 200, a stiffener 220, a rod handle 204, and a reel 270. The rod handle 204, the stiffener 220, and the rod blank 200 may be coupled together to form a fishing pole. The reel 270 may be coupled to a reel seat 206 on the rod handle 204 such that the fishing pole and the reel 270 may be operable as the fishing pole. The rod blank 200 may comprise a hollow interior 212. A fluid 216 may be forced into the hollow interior 212 of the rod blank 200 by the stiffener 220 and may increase pressure within the rod blank 200 to stiffen the rod blank 200. The pressure on the fluid 216 may be reduced by the stiffener 220 to allow the rod blank 200 to flex.

The rod blank 200 may be a cylindrical, tapered support for a fishing line 900. During casting, the rod blank 200 may bend and may act as a catapult to launch a lure, a hook, bait, or combinations thereof. A proximal end 219 of the rod blank 200 may be coupled to a distal end 218 of the stiffener 220. The rod blank 200 may comprise a plurality of guides 208 that are disposed linearly along the length of the rod blank 200 on the same side of the rod blank 200 as the reel 270. The plurality of guides 208 may guide the fishing line 900 along the rod blank 200.

The rod blank 200 may comprise the hollow interior 212. The hollow interior 212 may contain the fluid 216. The fluid 216 may be retained within the hollow interior 212 of the rod blank 200 by a piston 222 of the stiffener 220.

The stiffener 220 may be operable to pressurize the fluid within the hollow interior 212 of the rod blank 200 such that the rigidity of the rod blank 200 increases. The stiffener 220 may comprise the piston 222, a push rod 226, a trigger 230, a trigger release 240, and a stiffener body 250. The outside diameter of the piston 222 may be less than the inside diameter of the hollow interior 212 of the rod blank 200 such that the piston 222 fits within the hollow interior 212 at the proximal end 219 of the rod blank 200. The piston 222 may movably couple to the rod blank 200 via one or more seals 224 such that the fluid 216 is prevented from leaking out of the hollow interior of the rod blank 200.

The distal end 218 of the push rod 226 may be coupled to the proximal end 219 of the piston 222. The push rod 226 may be an armature that is operable to transfer movement of the trigger 230 to the piston 222. The push rod 226 may comprise a plurality of push rod teeth 228 disposed on the bottom of the push rod 226 adjacent to the trigger 230. The plurality of push rod teeth 228 may mesh with a plurality of trigger teeth 238. The push rod 226 may be guided as the push rod 226 moves through the stiffener 220 by one or more push rod guides 214 located within the stiffener body 250.

The trigger 230 may comprise a trigger pivot 232, a trigger lever 234, and a trigger top 236. The trigger lever 234 may be adapted to be pulled rearwards by a finger to increase the pressure within the rod blank 200. As the trigger lever 234 is pulled rearwards, the trigger 230 may pivot around the trigger pivot 232 such that the trigger top 236 moves forwards. The trigger top 236 may be curved to maintain contact with the push rod 226 as the trigger 230 pivots. The push rod 226 may move rearwards as the trigger 230 pivots in the opposite direction such that the trigger lever 234 moves forward.

The trigger release 240 may be operable to lock the trigger 230 when the piston 222 is in a forward position. The trigger release 240 may pivot around a release pivot 242. A release top 248 may be pressed against the trigger 230 by a spring 244. The release top 248 may move into a notch 252 on the trigger top 236 as the trigger top 236 moves forward. The release top 248 may prevent the trigger top 236 from moving rearwards thus retaining the piston 222 in a forward position. A release lever 246 located at the bottom of the trigger release 240 may be adapted to be pulled down by the finger such that the trigger release 240 pivots to move the release top 248 out of the notch 252. The piston 222, the push rod 226, and the trigger top 236 may move rearwards once the release top 248 has cleared the notch 252.

The rod handle 204 may be adapted for a hand of a user to hold the invention 100 while fishing. The distal end 218 of the rod handle 204 may couple to the proximal end 219 of the stiffener 220. The rod handle 204 may comprise the reel seat 206. The reel seat 206 may be a mounting point for the reel 270. A reel foot 274 of the reel 270 may be coupled to the rod handle 204 via the reel seat 206.

The reel 270 may comprise a spool 272, the reel foot 274, and a reel handle 276. The reel 270 may be operable to feed the fishing line 900 out of the reel 270 during casting and to retrieve the fishing line 900 when the reel handle 276 is cranked. The fishing line 900 may be wound around the spool 272. The reel 270 may allow the fishing line 900 to deploy from the spool 272 during casting. The spool 272 may rotate as the reel handle 276 is cranked such that the fishing line 900 is pulled into the reel 270 and wound around the spool 272.

In use, the piston 222 may be withdrawn from the hollow interior 212 of the rod blank 200 by pulling down on the release lever 246 to disengage the trigger release 240 and then moving the trigger lever 234 forward. With the piston 222 withdrawn, the rod blank 200 becomes more flexible for casting. After casting, the trigger 230 may be activated by pulling the trigger lever 234 rearwards to force the piston 222 into the hollow interior 212 of the rod blank 200, thus increasing the pressure within the rod blank 200. The trigger release 240 may engage the trigger 230 at the notch 252 to prevent the trigger 230 from moving and releasing the pressure. The pressure may cause the rod blank 200 to stiffen. When fish bites the lure or the bait, the stiff rod action may be conducive to setting the hook when the rod blank 200 is jerked back.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, a "fishing line" is a monofilament cord to which a hook or lure is attached for the purpose of capturing a fish.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "handle" is an object by which a tool, object, or door is held or manipulated with the hand.

As used herein, "inside diameter" or "inner diameter" refers to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, the word "interior" is used as a relational term that implies that an object is located or contained within the boundary of a structure or a space.

As used in this disclosure, a "notch" is an indentation formed in an edge or a cavity or aperture formed within a surface.

As used herein, "outside diameter" or "outer diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used herein, a "reel" refers to a cylindrical object with side walls around which a wire, filament, thread, cord, cable, string, line, rope, hose, tubing, or other rope-like object is wound.

As used in this disclosure, a "spool" is a cylindrical device upon which a flexible material, including but not limited to a rope, a cable, a yarn, a cord, a sheet of fabric, or a tape, can be wound. Depending on context, a spool may also comprise the flexible material stored upon the spool.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, the terms "stiff", "stiffer", and "stiffness" are comparative terms that may be used to compare the relative rigidity of two objects. Specifically, if a given force is applied to a first object and a second object, the object that deforms less is said to be stiffer or more stiff than the object that displayed greater deformation. Alternatively, it may be said that the object that deforms less possesses more stiffness.

As used herein, "stiffen" refers to an increase in the rigidity of an object. Specifically, if it now takes more force to achieve the same amount of deformation of an object that previously required a lesser amount of force to achieve, then the object is said to have stiffened.

As used in this disclosure, a "taper" is a continuous and typically, but not necessarily, gradual change in the span of a one or more dimensions of an elongated object that occurs in the apparent direction of elongation. An object that narrows along an axis may be called tapered.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A tension-adjusting fishing pole comprising:
a rod blank, a stiffener, a rod handle, and a reel;
wherein the rod handle, the stiffener, and the rod blank are coupled together to form a fishing pole;
wherein the reel is coupled to a reel seat on the rod handle such that the fishing pole and the reel are operable as the fishing pole;
wherein the rod blank comprises a hollow interior;
wherein a fluid is forced into the hollow interior of the rod blank by the stiffener and increases pressure within the rod blank to stiffen the rod blank;
wherein the pressure on the fluid is reduced by the stiffener to allow the rod blank to flex;
wherein the fluid is retained within the hollow interior of the rod blank by a piston of the stiffener;
wherein the stiffener is operable to pressurize the fluid within the hollow interior of the rod blank such that the rigidity of the rod blank increases;
wherein the stiffener comprises the piston, a push rod, a trigger, a trigger release, and a stiffener body;
wherein a release top is pressed against the trigger by a spring;
wherein the release top moves into a notch on the trigger top as the trigger top moves forward;
wherein the release top prevents the trigger top from moving rearwards thus retaining the piston in a forward position.

2. The tension-adjusting fishing pole according to claim 1
wherein the rod blank is a cylindrical, tapered support for a fishing line;
wherein a proximal end of the rod blank is coupled to a distal end of the stiffener.

3. The tension-adjusting fishing pole according to claim 2
wherein the rod blank comprises a plurality of guides that are disposed linearly along the length of the rod blank on the same side of the rod blank as the reel;
wherein the plurality of guides guide the fishing line along the rod blank.

4. The tension-adjusting fishing pole according to claim 3
wherein the rod blank comprises the hollow interior;
wherein the hollow interior contains the fluid.

5. The tension-adjusting fishing pole according to claim 4
wherein the outside diameter of the piston is less than the inside diameter of the hollow interior of the rod blank such that the piston fits within the hollow interior at the proximal end of the rod blank.

6. The tension-adjusting fishing pole according to claim 5 wherein the piston movably couples to the rod blank via one or more seals such that the fluid is prevented from leaking out of the hollow interior of the rod blank.

7. The tension-adjusting fishing pole according to claim 6 wherein the distal end of the push rod is coupled to the proximal end of the piston;

wherein the push rod is an armature that is operable to transfer movement of the trigger to the piston.

8. The tension-adjusting fishing pole according to claim 7 wherein the push rod comprises a plurality of push rod teeth disposed on the bottom of the push rod adjacent to the trigger;

wherein the plurality of push rod teeth mesh with a plurality of trigger teeth.

9. The tension-adjusting fishing pole according to claim 8 wherein the push rod is guided as the push rod moves through the stiffener by one or more push rod guides located within the stiffener body.

10. The tension-adjusting fishing pole according to claim 8 wherein the trigger comprises a trigger pivot, a trigger lever, and a trigger top;

wherein the trigger lever is adapted to be pulled rearwards by a finger to increase the pressure within the rod blank;

wherein as the trigger lever is pulled rearwards, the trigger pivots around the trigger pivot such that the trigger top moves forwards.

11. The tension-adjusting fishing pole according to claim 10 wherein the trigger top is curved to maintain contact with the push rod as the trigger pivots;

wherein the push rod moves rearwards as the trigger pivots in the opposite direction such that the trigger lever moves forward.

12. The tension-adjusting fishing pole according to claim 11 wherein the trigger release is operable to lock the trigger when the piston is in a forward position;

wherein the trigger release pivots around a release pivot.

13. The tension-adjusting fishing pole according to claim 12 wherein a release lever located at the bottom of the trigger release is adapted to be pulled down by the finger such that the trigger release pivots to move the release top out of the notch;

wherein the piston, the push rod, and the trigger top move rearwards once the release top has cleared the notch.

14. The tension-adjusting fishing pole according to claim 13 wherein the rod handle is adapted for a hand of a user to hold the tension-adjusting fishing pole while fishing;

wherein the distal end of the rod handle couples to the proximal end of the stiffener.

15. The tension-adjusting fishing pole according to claim 14 wherein the rod handle comprises the reel seat;

wherein the reel seat is a mounting point for the reel;

wherein a reel foot of the reel is coupled to the rod handle via the reel seat.

\* \* \* \* \*